United States Patent [19]

Martinmaas

[11] Patent Number: 4,744,324
[45] Date of Patent: May 17, 1988

[54] AMPHIBIOUS ALL TERRAIN VEHICLE (ATV) AND CONVERSION KIT

[76] Inventor: Werner W. Martinmaas, P.O. Box 6321, Reno, Nev. 89503

[21] Appl. No.: 897,047

[22] Filed: Aug. 15, 1986

[51] Int. Cl.$^4$ .............................................. B63H 1/00
[52] U.S. Cl. ..................................... 114/270; 440/90; 280/289 R
[58] Field of Search .......................... 114/270; 440/90; 280/289 A, 296; 180/15, 209, 906; 301/40 S, 36 R

[56] References Cited

U.S. PATENT DOCUMENTS

| | | | |
|---|---|---|---|
| 2,784,596 | 7/1953 | Franklin, Jr. ...................... | 301/36 R |
| 3,595,199 | 7/1971 | Faxas ...................................... | 440/11 |
| 3,688,731 | 9/1972 | Houle ................................... | 114/270 |
| 4,077,351 | 3/1978 | Girona .................................. | 440/90 |
| 4,214,792 | 7/1980 | Hardwicke et al. .............. | 301/36 R |
| 4,333,688 | 6/1982 | Lemmon et al. .................. | 301/36 R |
| 4,395,237 | 7/1983 | Watanabe ........................... | 114/270 |
| 4,493,658 | 1/1985 | Hildebrand .......................... | 440/90 |
| 4,494,937 | 1/1985 | Riermann ............................. | 440/90 |
| 4,522,420 | 6/1985 | Hannappel ...................... | 280/289 A |

FOREIGN PATENT DOCUMENTS 258243  3/1963  Australia ............................. 114/270

Primary Examiner—Joseph F. Peters, Jr.
Assistant Examiner—Edwin L. Swinehart
Attorney, Agent, or Firm—Wood, Dalton, Phillips, Mason & Rowe

[57] ABSTRACT

A self-propelled all terrain vehicle is converted to amphibious operation by means of an amphibious conversion kit that provides rear axle extensions to mount outer rear wheels that dualize the rear wheels, and radial paddle elements on the extensions between the dual rear wheels. Over-size tires on the dual rear wheels and on front wheel means of the vehicle provide flotation means capable of supporting the vehicle and a desired load in water.

15 Claims, 1 Drawing Sheet

U.S. Patent  May 17, 1988  4,744,324
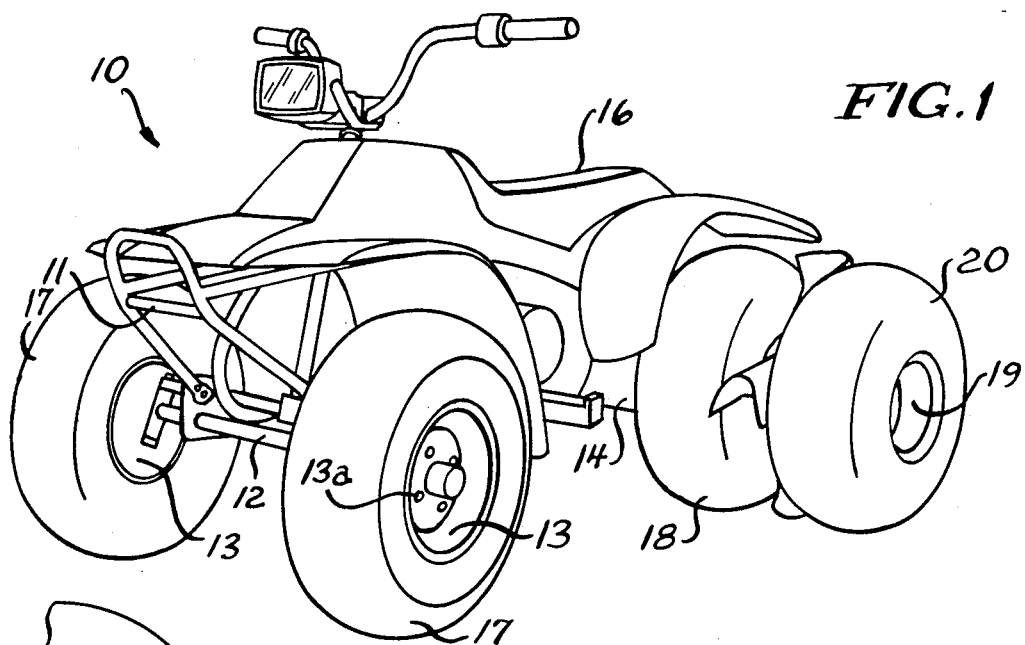
FIG. 1
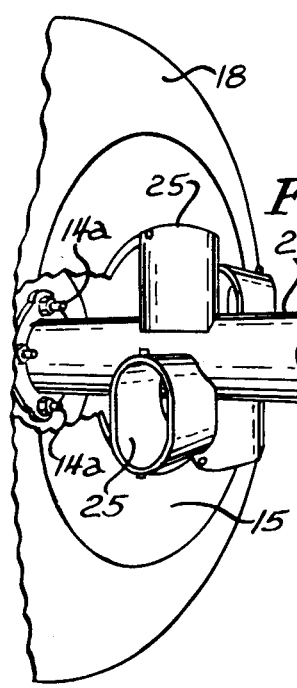
FIG. 2
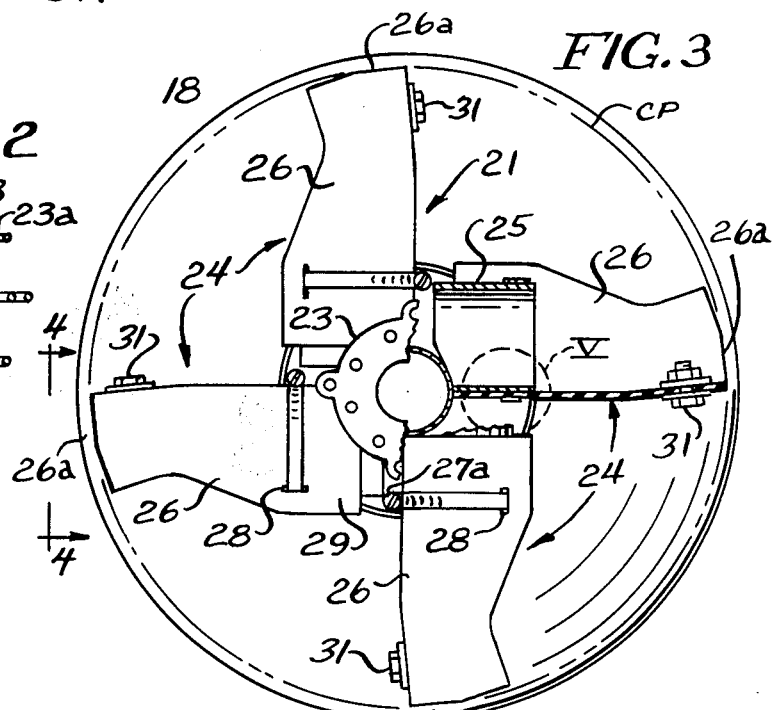
FIG. 3
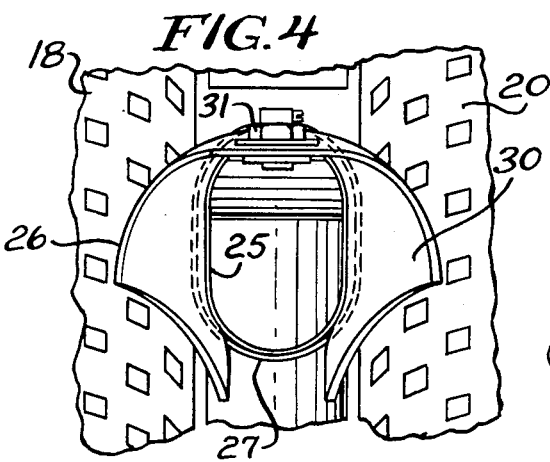
FIG. 4
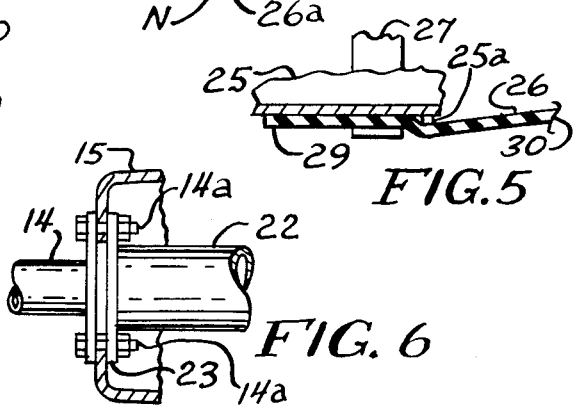
FIG. 5
FIG. 6

AMPHIBIOUS ALL TERRAIN VEHICLE (ATV) AND CONVERSION KIT

The invention relates to a self-propelled ATV that, by the use of multiple high flotation tires and a conversion kit, may be easily adapted for amphibious operation.

BACKGROUND OF THE INVENTION

Self-propelled ATV's are made in both three-wheel and four-wheel models, and have become extremely popular for rough use in rural areas, both for working farm and ranch operation, and as recreational vehicles. Such vehicles can be operated over all kinds of terrain, and because of the large tires used upon them, they travel easily over plowed fields, loose sand, muck, and through shallow water.

Insofar as this inventor is aware, there has heretofore been no amphibious conversion kit for ATV's that does not seriously interfere with ordinary use of the vehicle on land.

Reference is made to U.S. Pat. Nos. 4,494,937 and 4,522,420, both of which rely upon pontoon attachments for flotation.

SUMMARY OF THE INVENTION

In accordance with the present invention, an amphibious conversion kit permits the rear axle of an ATV to be provided with dual wheels, and the dual wheel adapter provides a mounting for paddle means that are between the tires of the dual wheels.

By using large enough tires upon the front wheel or wheels of an ATV, and also upon the dual rear wheels, the tires themselves provide flotation means capable of supporting the vehicle and a desired reasonable load in water.

A prototype of the apparatus herein disclosed has been operated successfully over all kinds of terrain and in deep water supporting a load of approximately 250 pounds.

In accordance with the present invention, the wheel mounting studs at each end of the rear axle of an ATV that has a single wheel at each end are used to detachably mount an axial hub that forms an axle extension adapted to mount an outer wheel and tire in spaced relation to the single wheel, thus converting the rear axle to dual wheel operation. The axial hub is part of paddle means that includes a plurality of generally radially extending paddle elements mounted on the hub between the dual wheels.

In a preferred embodiment of the conversion kit, the axial hub has four radially extending rigid collars welded to it, and a paddle member of stiffly resilient sheet material is detachably secured to each of the collars.

Preferably each paddle member consists of a single sheet of material having a mounting portion that closely embraces the collar, a removable fastening strap encircles the collar and extends through slots in the mounting portion of the paddle member to clamp the paddle member to the sleeve, and the paddle member has an outer paddle portion that flares laterally to substantially fill the space between the dual wheels.

THE DRAWINGS

FIG. 1 is a perspective view of a typical four-wheel ATV converted for amphibious operation in accordance with the invention;

FIG. 2 is a fragmentary perspective view of a single rear wheel and tire with the axial hub and integral sleeves of the conversion kit paddle means mounted upon the wheel mounting studs at the end of the ATV rear axle;

FIG. 3 is an end elevational view, with parts broken away and parts in section, illustrating the entire amphibious conversion kit at one end of an ATV rear axle;

FIG. 4 is a fragmentary elevational view on an enlarged scale, taken substantially as indicated along the line 4—4 of FIG. 3;

FIG. 5 is an enlarged fragmentary sectional view of that part of FIG. 3 which is within the circle V;

FIG. 6 is a fragmentary sectional view at one end of an ATV rear axle and attached axle extension.

DETAILED DESCRIPTION OF THE PREFERRED EMBODIMENT OF THE INVENTION

Referring to the drawings in detail, and referring first to FIG. 1, an ATV, indicated generally at 10, includes a frame 11 provided with a front steering axle 12 and front wheel means 13, a rear driving axle 14 and single rear driving wheels such as the wheel 15 seen in FIGS. 2 and 6, and means 16 on the frame providing a seat for an operator.

Tires 17 on the front wheels 13 and tires such as the tire 18 on the single rear driving wheel 15 are large enough that, when outer rear wheels 19 and tires 20 are on the vehicle, the tires are capable of providing flotation means that can support the vehicle and a desired reasonable load in water.

In a prototype of the invention, an ATV having a "dry weight"—i.e. without fuel—of about 315 pounds, and carrying a 250 pound load, functioned well as an amphibious vehicle with tires size 25×12×9.

Referring now particularly to FIGS. 2-6, the amphibious conversion kit of the present invention consists of a pair of paddle means, such as the paddle means indicated generally at 21 in FIG. 3, there being a paddle means for each end of the rear driving axle 14. The paddle means comprises an axial hub 22 that has a mounting plate 23 at each end. An inner end mounting plate 23 FIG. 6 is secured to wheel mounting studs 14a on an end of the rear driving axle 14 that are similar to the front wheel studs 13a seen in FIG. 1. The hub 22 forms an axle extension, and the outer end plate 23 of the hub is adapted to receive extension studs 23a that mount the outer wheel 19 and tire 20 in spaced relationship to the single wheel 15 and tire 18, thus converting the rear of the ATV to a dual wheel structure. The paddle means 21 also includes four generally radially extending paddle elements, each indicated generally at 24, mounted upon the hub 22.

Each paddle element 24 consists of a rigid, oval collar 25 that is welded to the hub, a paddle member 26 of stiffly resilient sheet material, and a removable fastening strap 27 that encircles the collar 25 and extends through slots 28 in a mounting portion 29 of the paddle member that closely embraces the collar. Screws 27a secure the fastening straps tightly around the collars 25; and each collar at its outer end has an external boss 25a that prevents outward radial movement of the fastening strap 27 when the latter is mounted encircling the sleeve collar 25 and clamping the paddle member 26 thereto.

As best seen in FIG. 4, each paddle member 26 has an outer paddle portion 30 that flares laterally to substantially fill the space between the tires 18 and 20 on the dual wheels. The flare of the paddle portion 30 is produced by a rigid paddle spreader means 31 that consists of a pair of large diameter washers clamped to opposite faces of the paddle portion 30 by means of a bolt and nut.

With the small ATV upon which the prototype of the present amphibious conversion kit was tested, the paddle members 26 were fabricated from standard 3/16 inch flat conveyor belting that consists of rubber with two plies of nylon cord. It is obvious that for larger ATV's the tire size would need to be increased for flotation, and possibly the paddle members 26 would need to be made of heavier sheet material. The use of stiffly resilient paddle members 26 permits them to be easily clamped around the collars 25 and flare laterally so the outer paddle portions 30 are wider. Such paddle portions also give a good "bite" in water, but may bend to avoid damage if they strike a solid obstruction.

As best seen in FIG. 3, upon rotation of the paddle means 21 the outer ends 26a of the paddle members 26 follow a circular path cp the nadirn of which is slightly above a supporting surface when the vehicle is on land. Thus, the paddles do not interfere in any way with normal land operation of the ATV.

The foregoing detailed description is given for clearness of understanding only and no unnecessary limitations should be understood therefrom, as modifications will be obvious to those skilled in the art.

I claim:

1. In a self-propelled all terrain vehicle that has a frame provided with a front steering axle and front wheel means with front tire means thereon, a rear driving axle having opposite ends with wheel mounting studs at said opposite ends and single rear wheels mounted on said studs, said single rear wheels having single rear tires thereon, and means on said frame providing a seat for an operator, the improvement comprising, in combination;

a pair of axial hubs having inner ends by which they are detachably mounted on said mounting studs outwardly of said single rear wheels to provide extensions at both ends of the axle and said axial hubs having outer ends;

a pair of outer rear wheels mounted on the outer ends or said axial hubs, said outer rear wheels having outer rear tires thereon which are in outwardly spaced relationship to said single rear tires, said front tire means, said single rear tires and said outer rear tires being large enough that they provide flotation means capable of supporting the vehicle and a desired reasonable load in water without other buoyant means on the vehicle;

and paddle elements mounted on each of said axial hubs between the single rear wheels and the outer rear wheels to propel the vehicle over water, each of said paddle elements including a plurality of generally radially extending paddle members having outer ends that, during axial rotation of the paddle means, follow a circular path the nadir of which is slightly above a supporting surface when the vehicle is on land, whereby said vehicle is totally amphibious.

2. The improvement of claim 1 in which each paddle element comprises a generally radially extending rigid collar fixed to said hub and a paddle member of stiffly resilient sheet material detachably secured to said collar.

3. The improvement of claim 2 in which each paddle member consists of a single sheet of material having a mounting portion that closely embraces the rigid collar, a removable fastening strap encircles the collar and extends through slots in the mounting portion of the paddle member to clamp the paddle member to the collar, and in which the paddle member has an outer paddle portion that flares laterally to substantially fill the space between the tires on the dual wheels.

4. The improvement of claim 3 that includes a rigid paddle spreader member secured on the paddle portion to enhance the lateral flare of said paddle portion.

5. The improvement of claim 3 that includes an external boss on an outer extremity of the rigid collar which prevents outward radial movement of the fastening strap.

6. The improvement of claim 1 in which each paddle element comprises a rigid collar fixed to the hub, and a paddle member of stiffly resilient sheet material detachably secured to each of said collars.

7. The improvement of claim 6 in which each paddle member consists of a single sheet of material having a mounting portion that closely embraces the rigid collar, a removable fastening strap encircles the collar and extends through slots in the mounting portion of the paddle member to clamp the paddle member to the collar, and in which the paddle member has an outer paddle portion that flares laterally to substantially fill the space between the tires on the single wheel and on the outer wheel.

8. The improvement of claim 7 that includes a rigid paddle spreader means secured on the paddle portion to enhance the lateral flare of said paddle portion.

9. The improvement of claim 7 that includes an external boss on an outer extremity of the rigid collar which prevents outward radial movement of the fastening strap.

10. An amphibious conversion kit for a self-propelled all terrain vehicle that has a frame provided with a front steering axle and front wheel means, a rear driving axle having opposite ends with wheel mounting studs at said opposite ends and single rear wheels detachably mounted on said studs, and means on said frame providing a seat for an operator, said front wheel means and said single rear wheels having tires thereon which, in combination with outer rear wheels having tires thereon, are capable of providing flotation means that can support the vehicle and a desired reasonable load in water without other buoyant means on the vehicle, said conversion kit comprising, in combination:

an axial hub having an inner end by which it is adapted to be detachably mounted on said wheel mounting studs, and having an outer end, said hub forming an axle extension that is adapted to mount at its outer end a outer rear wheel having a tire thereon in outwardly spaced relationship to said single wheel, and a plurality of generally radially extending paddle elements mounted on the hub, the radial length of said paddle elements being less than the combined radius of the inner rear wheels and tires, whereby when said conversion kit axial hub is mounted on said wheel mounting studs and has an outer rear wheel and tire mounted at its outer end said paddle elements are outward of the single rear wheel and inward of the outer rear wheel, and the vehicle is totally amphibious.

11. The conversion kit of claim 10 in which each paddle element comprises a rigid collar fixed to the hub, and a paddle member of stiffly resilient sheet material adapted to be detachably secured to each of said collars.

12. The conversion kit of claim 11 in which each paddle member consists of a single sheet of material having a mounting portion that closely embraces the rigid collar, a removable fastening strap is adapted to encircle the collar and extend through slots in the mounting portion of the paddle membe to clamp the paddle member to the collar, and in which the paddle member has an outer paddle portion that is adapted to flare laterally to substantially fill the space between the tire on the single rear wheel and the tire on the outer rear wheel.

13. The conversion kit of claim 12 that includes a rigid paddle spreader means adapted to be secured on the paddle portion of each paddle member to enhance the lateral flare of said paddle portion.

14. The conversion kit of claim 13 that includes a rigid paddle spreader means adapted to be secured on the paddle portion of each paddle member to enhance the lateral flare of said paddle portion.

14. The conversion kit of claim 12 that includes an external boss on an outer extremity of the rigid collar which prevents outward radial movement of the fastening strap when the latter is mounted encircling the sleeve collar and clamping the paddle member thereto.

15. The conversion kit of claim 12 that includes an external boss on an outer extremity of the rigid collar which prevents outward radial movement of the fastening strap when the latter is mounted encircling the sleeve collar and clamping the paddle member thereto.

* * * * *